United States Patent [19]
Sakamoto et al.

[11] Patent Number: 5,811,179
[45] Date of Patent: Sep. 22, 1998

[54] MAGNETIC RECORDING MEDIUM

[75] Inventors: Kazunori Sakamoto, Katano; Hideo Hatanaka, Neyagawa; Yasuhiro Ueyama, Kadoma; Kiyoshi Kobata, Takatsuki; Kazunori Kubota; Hideki Okumura, both of Neyagawa, all of Japan

[73] Assignee: Matsushita Electric Industrial Co., Ltd., Kadoma, Japan

[21] Appl. No.: 554,281

[22] Filed: Nov. 6, 1995

Related U.S. Application Data

[63] Continuation-in-part of Ser. No. 222,803, Apr. 5, 1994, abandoned.

[30] Foreign Application Priority Data

| Apr. 6, 1993 | [JP] | Japan | 5-79239 |
| Apr. 21, 1993 | [JP] | Japan | 5-94032 |
| Apr. 5, 1994 | [JP] | Japan | 6-67113 |

[51] Int. Cl.$^6$ .................................................. G11B 5/708
[52] U.S. Cl. .......................... 428/323; 428/328; 428/329; 428/332; 428/694 BA; 428/694 BN; 428/900
[58] Field of Search ................. 428/694 B, 694 BA, 428/694 BN, 694 SL, 900, 928, 323, 328, 329, 332

[56] References Cited

U.S. PATENT DOCUMENTS

| 4,015,042 | 3/1977 | Chassaigne | 428/325 |
| 4,420,408 | 12/1983 | Kajimoto et al. | 256/62.54 |
| 4,425,400 | 1/1984 | Yamaguchi et al. | 428/329 |
| 4,547,425 | 10/1985 | Naruse | 428/328 |
| 4,568,619 | 2/1986 | Hiller | 428/694 |
| 4,609,588 | 9/1986 | Hosaka et al. | 428/329 |
| 4,626,463 | 12/1986 | Fujishiro et al. | 428/143 |
| 4,668,568 | 5/1987 | Fujiyama et al. | 428/323 |
| 4,687,704 | 8/1987 | Miyoshi et al. | 428/328 |
| 5,001,006 | 3/1991 | Saito et al. | 428/323 |
| 5,080,967 | 1/1992 | Noguchi et al. | 428/323 |
| 5,358,777 | 10/1994 | Kojima et al. | 428/212 |

FOREIGN PATENT DOCUMENTS

| 0 220 580 | 5/1987 | European Pat. Off. . |
| 55-28507 | 2/1980 | Japan . |
| 62-34329 | 2/1987 | Japan . |
| 2 113422 | 4/1990 | Japan . |
| 4-79059 | 12/1992 | Japan . |
| 5-13328 | 2/1993 | Japan . |

*Primary Examiner*—Stevan A. Resan
*Attorney, Agent, or Firm*—Renner, Otto, Boisselle & Sklar

[57] ABSTRACT

A magnetic recording medium including a non-magnetic polymeric support and a magnetic layer on the non-magnetic polymeric support. The magnetic layer is positioned to be in contact with a record/playback head and includes ferromagnetic powder, abrasive material and binder resin, with at least 40 parts by weight of the abrasive material per 100 parts by weight of the ferromagnetic powder. The ferromagnetic powder has a saturation magnetization σs of 80 emu/g or more and long axis length of 0.25 μm or less.

30 Claims, No Drawings

MAGNETIC RECORDING MEDIUM

This application is a continuation-in-part of application Ser. No. 08/222,803 filed on Apr. 5, 1994 now abandoned.

BACKGROUND OF THE INVENTION

1. Field of the Invention

The present invention relates to a magnetic recording medium, particularly to a coat-type magnetic recording medium, e.g., a cassette tape for a digital audio unit, in which a magnetic layer is formed by applying a magnetic paint onto a non-magnetic support.

2. Description of the Related Art

In recent years, there have been demands for information recording on a magnetic tape with a higher density, in accordance with an improvement of record/playback instruments. Further, in various kinds of record/playback instruments, a digital recording method has been adopted for recording on a magnetic tape in place of a conventional analog recording method. In the field of audio units, a digital audio tape recorder (referred to as DAT hereinafter) and a digital compact cassette tape recorder (referred to as DCC hereinafter) for commercial uses have been developed and commercialized using these improved techniques.

Similar to conventional video cassette recorders (referred to as VCR hereinafter), DAT has a record/playback head disposed on a rotation cylinder and performs record/playback with the same record/playback mechanism as that of VCR using a DAT tape. Accordingly, in DAT, magnetic recording media other than a tape only for DAT can not be used for record/playback operation. This inconvenience has prevented DAT from being accepted by a wide range of users, even after five years of commercialization.

In consideration of such a situation of DAT, DCC was developed as a digital recording tape compatible with a compact cassette tape of an analog recording method (referred to as an ACC tape hereinafter) which has had widespread usage, and as a record/playback system using the same. The DCC has a fixed type multi-channel head to which thin film formation techniques for a semiconductor are applied. This enables information recording with a high efficiency by means of signal compression techniques. In light of its compatibility with the ACC tape, this DCC is expected to be widespread in the future, and lately much attention has been paid thereto.

The following are requirements for DCC tape, which are more strict than those for conventional DAT tape or ACC tape.

First, for keeping upper compatibility with the ACC tape as well as performing recording in a digital method, information has to be recorded on a DCC tape with a high density at an extremely slow relative speed (4.78 cm/sec) between the head and the tape. For this purpose, the shortest recording wavelength has to be 1 $\mu$m or less. Also, for using the multi-channel head, it is necessary to make the width of track narrower. In order to record information under such conditions, the magnetic recording medium for DCC tape is required to have a high magnetic energy and also to enable a high level of output.

In order to design a magnetic recording medium with high magnetic energy, metallic powder is used as magnetic powder having a coercive force greater than the conventional one. However, in the case of DCC, the multi-channel head of a thin film causes magnetization saturation of the head if the coercive force of the magnetic recording medium is set to be very high. This makes proper recording impossible, and necessary electromagnetic conversion characteristics are not obtainable. Further, overwrite characteristics deteriorate, which results in increased degradation of the error rate.

Second, for realizing a good error rate of the magnetic recording medium, absence of an extraneous material within or on the magnetic layer and reduction of the drop out are important. Here, "drop out" means missing of data, the condition that part of the data is not recorded or reproduced, which is caused by the extraneous material.

Since DCC has a fixed type head and not a rotation head, the DCC can not blow off minute dust or dirt stuck to the magnetic layer of the magnetic tape by the high-speed rotation of the head (at 1800 rpm in the case of VHS-type VCR) for the purpose of self-cleaning. If it is taken into consideration that recording with a short wave length of 1 $\mu$m or less is required in a DCC system, the drop out is caused mainly by minute dusts on the order of a micron stuck on the surface of the magnetic layer.

Although the dusts can be from outside of the instrument into the magnetic layer, in many cases, the dusts result from the exfoliation of the tape itself, caused by a part of the magnetic layer being peeled off or pulverized due to the traveling movement of the tape. Accordingly, it is essential for attaining a good error rate to design a magnetic layer with the least possibility of peeling off or pulverization in various conditions ranging from extremely low temperatures to high temperatures and humidity. It has already been known that application of an abrasive material is effective for restraining pulverization and improving durability to wear (see Japanese Laid-Open Patent Publication Nos. 55-28507, 58-158032, 59-28235, 60-10418, 61-92425 and 61-194629). However, it has been difficult to obtain a magnetic layer satisfying the above two conditions, even by producing a magnetic layer by combining conventional magnetic particles and abrasive material to obtain a magnetic layer suitable for DCC tape. Particularly, it has been very difficult to produce a magnetic layer providing magnetic conversion characteristics and an error rate which are required for the DCC tape.

SUMMARY OF THE INVENTION

In one aspect of the present invention, a magnetic recording medium includes a non-magnetic polymeric support and a magnetic layer on the non-magnetic polymeric support; the magnetic layer positioned to be in contact with a record/playback head and including ferromagnetic powder, abrasive material and binder resin, with at least 40 parts by weight of the abrasive material per 100 parts by weight of the ferromagnetic powder, wherein the ferromagnetic powder has a saturation magnetization $\sigma s$ of 80 emu/g or more and long axis length of 0.25 $\mu$m or less.

In one embodiment of the invention, the ferromagnetic powder includes at least one of magnetic gamma iron oxide powder, magnetic iron carbide powder and ferromagnetic metallic powder.

In one embodiment of the invention, the ferromagnetic powder includes magnetic gamma iron oxide, and the magnetic layer contains 40 to 90 parts by weight of the abrasive material per 100 parts by weight of the ferromagnetic powder.

In one embodiment of the invention, the ferromagnetic powder includes magnetic iron carbide, and the magnetic layer contains 40 to 90. parts by weight of the abrasive material per 100 parts by weight of the ferromagnetic powder.

In one embodiment of the invention, the ferromagnetic powder includes ferromagnetic metallic powder having the saturation magnetization σs of 130 emu/g or more, and the magnetic layer contains 40 to 130 parts by weight of the abrasive material per 100 parts by weight of the ferromagnetic powder.

In one embodiment of the invention, the ferromagnetic powder includes 30% by weight or less of ferromagnetic metallic powder.

In one embodiment of the invention, the ferromagnetic powder has a coercive force in the range of 50000 to 60000 A/m.

In one embodiment of the invention, the abrasive material includes at least one of an abrasive material of particle diameter of 0.4 μm or less with a Moh's hardness of 5 to 7 and an abrasive material of particle diameter of 0.25 μm or less with a Moh's hardness of 7 or more.

In one embodiment of the invention, 15 to 30 parts by weight of the binder resin is contained per 100 parts by weight of the total of the ferromagnetic powder and the abrasive material.

In another aspect of the present invention, a magnetic recording medium for a digital compact cassette tape, comprising a non-magnetic polymeric support and a magnetic layer on the non-magnetic polymeric support, the magnetic layer positioned to be in contact with a record/playback head and including ferromagnetic powder, binder resin and abrasive material with the ratio of at least 40 parts by weight of the abrasive material per 100 parts by weight of the ferromagnetic powder, wherein the ferromagnetic powder has a saturation magnetization σs of 80 emu/g or more and long axis length of 0.3 μm or less.

In still another aspect of the present invention, a magnetic recording medium includes a non-magnetic polymeric support; and a magnetic layer on the non-magnetic polymeric support, the magnetic layer positioned to be in contact with a record/playback head and including ferromagnetic powder, abrasive material and binder resin, with at least 40 parts by weight of the abrasive material per 100 parts by weight of the ferromagnetic powder. The ferromagnetic powder includes at least one of magnetic gamma iron oxide powder, magnetic iron carbide powder and ferromagnetic metallic powder.

In one embodiment of the invention, the ferromagnetic powder includes magnetic gamma iron oxide having a saturation magnetization σs of 80 emu/g or more and long axis length of 0.25 μm or less, and the magnetic layer contains 40 to 90 parts by weight of the abrasive material per 100 parts by weight of the ferromagnetic powder.

In one embodiment of the invention, the ferromagnetic powder includes magnetic iron carbide having a saturation magnetization σs of 80 emu/g or more and long axis length of 0.25 μm or less, and the magnetic layer contains 40 to 90 parts by weight of the abrasive material per 100 parts by weight of the ferromagnetic powder.

In one embodiment of the invention, the ferromagnetic powder includes ferromagnetic metallic powder having a saturation magnetization σs of 130 emu/g or more, and the magnetic layer contains 40 to 130 parts by weight of the abrasive material per 100 parts by weight of the ferromagnetic powder.

In one embodiment of the invention, the ferromagnetic powder has a coercive force in the range of 50000 to 60000 A/m.

In still another aspect of the present invention, a magnetic recording medium for a digital compact cassette tape includes a non-magnetic polymeric support; and a magnetic layer on the non-magnetic polymeric support, the magnetic layer positioned to be in contact with a record/playback head and including ferromagnetic powder, abrasive material and binder resin, with at least 40 parts by weight of the abrasive material per 100 parts by weight of the ferromagnetic powder. The ferromagnetic powder includes at least one of magnetic gamma iron oxide powder, magnetic iron carbide powder and ferromagnetic metallic powder, the ferromagnetic powder has a saturation magnetization σs of 80 emu/g or more and long axis length of 0.25 μm or less.

In one embodiment of the invention, the magnetic layer contains 40 to 90 parts by weight of the abrasive material per 100 parts by weight of the ferromagnetic powder.

In one embodiment of the invention, the ferromagnetic powder includes ferromagnetic metallic powder having a saturation magnetization σs of 130 emu/g or more, and the magnetic layer contains 40 to 130 parts by weight of the abrasive material per 100 parts by weight of the ferromagnetic powder.

The present invention described herein makes possible the advantages of providing (1) a DCC tape adaptable to a DCC system and capable of digital recording, while keeping upper compatibility; (2) a DCC tape in which recording can be sufficiently performed without causing magnetic saturation of a multi-channel head of a thin film, realized by setting a coercive force Hc in an appropriate range; (3) a DCC tape in which a sufficient output is ensured even in recording at a short wave length of 1 μm or less or a long wave length of 5 μm or more, and even if applying an abrasive material in an extremely larger amount than conventional, realized by using a magnetic iron oxide and/or a magnetic iron carbide of which long axis lengths are short and having great magnetic energy with large σs, usable in combination or individually; (3) a DCC tape in which output reduction in the region of long wave length can be supplemented by applying the metallic magnetic powder of a high value of σs to ferromagnetic powder in an appropriate amount up to 30% by weight, which enables application of a large amount of additional abrasive material.

These and other advantages of the present invention will become apparent to those skilled in the art upon reading and understanding the following detailed description.

DESCRIPTION OF THE PREFERRED EMBODIMENTS

First, the present invention will be described generally, and then, examples and comparative examples thereof will be described.

A magnetic recording medium of the invention includes a non-magnetic support and a magnetic layer formed on the non-magnetic support. The magnetic layer is mainly formed of magnetic powders, an abrasive material, and a binder resin material; and is positioned to be in contact with a record/playback head.

It is preferable that the magnetic powder is ferromagnetic. Magnetization saturation of a multi-channel head used in the DCC is prevented by selecting the coercive force Hc of the magnetic powder to be an adequate value, which results in a good recording. Further, by using magnetic powder with its long axis length being short, the surface properties of the magnetic layer are improved and an efficient output is obtained even when a recording at a wavelength of 1 μm or less.

Specifically, the coercive force Hc of the magnetic powder is preferably in the range of 50000 A/m to 60000 A/m, and especially, in the range of 55000 1000 A/m. When the coercive force Hc exceeds 60000 A/m, the head is magnetized to saturation. In such a case, good recording in the region of short wavelengths is not properly performed. This results in reduction of output as well as deterioration of overwrite characteristics. When the coercive force Hc is less than 50000 A/m, necessary electromagnetic conversion characteristics are unobtainable due to lowering of the magnetic energy of the magnetic layer. Nevertheless, magnetic powders are usable for the magnetic layer as magnetic powder suitable for DCC tape, unless having the coercive force considerably departs from the above-mentioned range.

It is preferable that the long axis length of the magnetic powder is 0.3 μm or less, especially, from 0.15 μm to 0.25 μm. In the case where the long axis length is greater than 0.3 μm, the surface properties of the magnetic layer deteriorate, which results in lowering of the output. In the case where the long axis length is less than 0.15 μm, reduction of the amount of Fe(II) in the magnetic powder lowers the saturation magnetization σs. As a result, the output from the entire magnetic layer is reduced and electromagnetic conversion characteristics deteriorate.

Magnetic powders of iron oxide, iron carbide, or metallic powders are usable as such ferromagnetic powders. Ferromagnetic powders of metal oxides such as fine needle-like γ-Fe$_2$O$_3$ and γ-Fe$_2$O$_3$ coated with Co are usable as the magnetic powders of iron oxide. It is preferable that the magnetic powder of iron oxide has a saturation magnetization of 80 emu/g or more. These metal oxides may be subject to surface treating with Al—Si type oxides or Si type oxides so as to have excellent weatherability under the conditions of high temperature and humidity. The metal magnetic powder obtained by dehydrating and reducing α-FeOOH particles by hydrogen are usable as the ferromagnetic metal powder. Preferably, the metal magnetic powder has a saturation magnetization of σs of 80 emu/g or more, and have good durability to erosion and superior conductivity, at least of which surface is iron carbide. It is preferable that the metal magnetic powder has a magnetic saturation of 130 emu/g or more. Ni, Ca, Co and other metals may be added to these magnetic powders for controlling the magnetic characteristics. Al, Cr, Si and other elements may be added thereto in consideration of the durability to weather, prevention of sintering at the time of fabricating the magnetic powder, or the like.

The magnetic layer of the invention may include either only one kind or plural kinds of magnetic powder in combination among the above-mentioned magnetic powders. For example, a mixture of magnetic iron oxide having saturation magnetization σs of 80 emu/g or more and with a long axis length of 0.25 μm or less and magnetic iron carbide having saturation magnetization σs of 80 emu/g or more and with a long axis length of 0.25 μm or less may be used for the magnetic layer. Also, a mixture of magnetic carbide having saturation magnetization σs of 80 emu/g or more and with long axis length of 0.25 μm or less and magnetic iron carbide having saturation magnetization σs of 80 emu/g or more and with long axis length of 0.25 μm or less may be used for the magnetic layer. In the case of using the mixture of magnetic iron oxide or magnetic iron carbide and magnetic metallic powder for the magnetic layer as ferromagnetic powder, it is preferable that the ratio of the magnetic metallic powder in the ferromagnetic powder is 30 parts by weight or less for preventing deterioration of surface properties of the surface of the magnetic layer and lowering of output in the region of short wavelength.

The abrasive material is added to the magnetic layer so that the coated magnetic layer may not peel off from the non-magnetic support. In the case of using an abrasive of Moh's hardness of 5–7, an average particle diameter of the abrasive material is preferably 0.40 μm or less. In the case of using an abrasive of Moh's hardness of more than 7, an average particle diameter of the abrasive material is preferably 0.3 μm or less, more preferably, 0.25 μm or less. If the Moh's hardness is less than 5, the effect of preventing peeling of magnetic layer is reduced, and the magnetic layer of the tape can be pulverized or peeled off during operation, resulting in deterioration of the error rate. On the other hand, if the Moh's hardness is much larger than 7, the head is worn during the traveling of the tape. Accordingly, it is preferable that the average particle diameter is 0.25 μm or less.

As an abrasive material having Moh's hardness of 5–7, abrasive materials made of α-Fe$_2$O$_3$, TiO$_2$, ZnO, MgO or the like are preferably used. These abrasive materials may be used individually or in a combination of 2 materials or more. As an abrasive material having Moh's hardness of more than 7, abrasive materials made of α-Al$_2$O$_3$, Cr$_2$O$_3$, SiO$_2$ or the like are preferably used. These abrasive materials also may be used individually or in combination of 2 materials or more. Further, the above-mentioned abrasive material having Moh's hardness of 5–7 and the above-mentioned abrasive material having Moh's hardness of more than 7 may be used in combination or mixed.

The magnetic recording medium with superior electromagnetic conversion characteristics and having a magnetic layer which does not easily peel off from a non-magnetic support is obtained by using the abrasive material having a particle diameter and a Moh's hardness which fall within the above-mentioned range. For forming a magnetic layer, it is preferable that the abrasive material be applied at the ratio of 30 parts or more by weight per 100 parts by weight of the above-mentioned magnetic iron oxide, magnetic iron carbide, or a mixture of the two. The abrasive material is applied more preferably at the ratio of 40–90 parts by weight; a ratio of 85–90 parts by weight being most preferable. By using the magnetic powder and the abrasive material having the above-mentioned characteristics, sufficient output is ensured even when recording at a short wave length of 1 μm or less or a long wave length of 5 μm or more, and even if applying an abrasive material in much greater amount than is conventional. In the case of using ferromagnetic metallic powder as magnetic powder, it is preferable to use 40–130 parts by weight of abrasive material per 100 parts by weight of magnetic powder.

As a binder resin of the present invention, conventionally known resins as follows are widely usable: vinyl chloride-vinyl acetate copolymer, vinyl chloride-vinyl acetate-vinyl alcohol copolymer, vinyl chloride-vinylidene chloride copolymer, polyurethane resin, polyester resin, acrylonitrile-butadiene copolymer, cellulose-acetate-butyrate, epoxy resin, acrylic acid resin, polyvinylacetal resin and polyvinylbutyral resin. These resins may be used individually, but normally used in combinations of 2 resins or more.

Preferably, the amount of the binder resin is in the range of 15–30 parts by weight per 100 parts by weight of the total amount of the ferromagnetic powder and the abrasive powder in the magnetic layer. If the amount of the binder resin is below this range, the dispersion characteristics of the magnetic powder deteriorate, which degrades the electromagnetic conversion characteristics. In addition, part of the magnetic layer may pulverize and detach therefrom or peel off during endurance traveling of the tape due to degradation in durability of the magnetic layer, which results in deterioration of error rate. Conversely, if the amount of the binder material is above this range, an extra part of the binder material rises on the surface of the magnetic layer at a calendar process. This causes a spacing loss between the head and the magnetic layer, which results in deterioration of electromagnetic conversion characteristics. Further, the friction factor to the head increases because of a raised layer of resin on the magnetic layer. As a result, tape damage and pulverization of the magnetic layer occur, especially in endurance traveling of the tape at ambient high temperature, deteriorating the error rate.

The magnetic recording tape is obtained by preparing a magnetic paint by dispersing the above-mentioned magnetic powder, abrasive material and binder resin in an organic solvent, applying the resultant paint to the non-magnetic support, and then performing calendar processing after the paint is dried. These continuous fabricating methods are conventionally known. For preparing the magnetic paint, various kinds of kneading machines, such as roll mill, kneader, attritor, double planetary mixer, high-speed mixer, high-speed stone mill, agitator mill, sand mill, spike mill, pin mill, ball mill, pebble mill, high-speed machine, ultra sonic dispersing machine are usable, individually or in a combination of 2 or more kinds of machine.

For preparing the magnetic paint, conventionally used solvents are usable, such as ketones (e.g., acetone, methylethylketone, methylisobutylketone and cyclohexane), alcohols (e.g., methanol, ethanol, propanol and butanol), esters (e.g., methyl acetate, ethyl acetate, ethyl lactate, glycol acetate, and monoethylether), glycol ethers (e.g., ethylene glycol dimethyl ether, ethylene glycol monoethyl ether, and dioxane), aromatic hydrocarbons (e.g., benzene, toluene and xylene), aliphatic hydrocarbons (e.g., hexane and heptane) and nitropropane.

As a non-magnetic support to which this magnetic paint is applied, the following are examples of a suitable material: polyesters (e.g., polyethylene telephthalate and polyethylene naphthalate), polyolefines (e.g., polypropylene and polyethylene), cellulose derivatives (e.g., cellulose triacetate and cellulose diacetate), polyvinylchloride, polyimide and polyamide.

Apart from these, higher fatty acids and fatty acid esters can be added to the magnetic layer as a lubricant, and carbon black and the like can be added thereto as an electrification preventing material.

Further, in the magnetic recording medium of the invention, a back coat layer composed of non-magnetic powder and binder, and if necessary, lubricant and abrasive material in addition thereto may be formed on one of two sides of the non-magnetic support, for improvement in traveling ability and application of electrification preventing ability like in video tapes, audio tapes and computer tapes.

Hereinafter, the present invention will be described by way of illustrative examples and comparative examples.

EXAMPLE 1

| | |
|---|---|
| Co-γ-$Fe_2O_3$ | 100 parts by weight |
| (saturation magnetization as: 83 emu/g, long axis length: 0.20 μm, coercive force Hc: 54000 A/m) | |
| Carbon black | 3 parts by weight |
| (Tokai Carbon Co., Ltd. Seast GS) | |
| Titanium oxide | 70 parts by weight |
| (rutile structure, Moh's hardness: 7, particle diameter: 0.25 μm) | |
| Methylethylketone | 9 parts by weight |
| Toluene | 6 parts by weight |
| Cyclohexanone | 3 parts by weight |

The above-mentioned materials are thrown into a 50L planetary mixer to be agitated and mixed for an hour. Co-γ-$Fe_2O_3$, carbon black, and titanium oxide are used as magnetic powder, electrification preventing material, and abrasive material, respectively.

| | |
|---|---|
| Vinyl chloride-vinyl acetate copolymer | 12 parts by weight |
| (Nippon Zeon Co., Ltd. MR-110) | |
| Polyurethane resin | 18 parts by weight |
| (Toyo Boseki K.K. UR-8300) | |
| Methylethylketone | 19 parts by weight |
| Toluene | 19 parts by weight |
| Cyclohexanone | 6 parts by weight |

Further, the above-mentioned materials are gradually poured from another tank into the above mixture, spending 2 hours, to be agitated and mixed for an hour after the pouring is completed.

| | |
|---|---|
| Methylethylketone | 1 part by weight |
| Toluene | 0.5 part by weight |
| Cyclohexanone | 0.5 part by weight |

Then, the above-mentioned solvent mixture is gradually poured into the above mixture slowly, spending 2 hours. After it is confirmed that the mixture has become a large mass and that consumption power of the kneader is at a maximum, the mixture is further kneaded for 8 hours.

| | |
|---|---|
| Methylethylketone | 60 parts by weight |
| Toluene | 60 parts by weight |
| Cyclohexanone | 20 parts by weight |

Then, the above-mentioned amount of mixture solvent is gradually poured into the mixture, spending 3 hours, so as to dilute the mixture. After the dilution obtained by the above process is transferred to another tank, materials of the below-mentioned composition are added thereto. After agitation and mixing by a resolver, dispersion is performed by a sand grinder to make a magnetic paint.

| | |
|---|---|
| Dilution | 407 parts by weight |
| Methylethylketone | 45 parts by weight |
| Toluene | 45 parts by weight |
| Cyclohexanone | 15 parts by weight |

The materials of the below-mentioned composition are added to the total amount of obtained magnetic paint to perform the coating.

| | |
|---|---|
| Stearic acid | 2 parts by weight |
| Stearic acid-n-butyl | 1 parts by weight |
| coronale L | 7.5 parts by weight |

The obtained magnetic paint is coated on a polyester base film having a thickness of 10 μm and a surface roughness of 15 nm so as to form a dry film of the magnetic paint having a thickness of 2.5 μm after drying the obtained magnetic film coated on the polyester base film. Orientation magnetic field is then applied to the magnetic paint coated on the polyester base film. Further, after drying the magnetic paint with a hot air and performing a calendar process at 80° C., the magnetic paint on the polyester base film is kept in an oven at 60° C. for 24 hours for hardening processing. After being hardened, the magnetic paint on the polyester base film is cut to have a width of 3.78 mm and thereby an audio tape is produced.

EXAMPLE 2

A magnetic paint is prepared similarly to Example 1, with the added -amount of titanium oxide used as an abrasive material in Example 1 decreased from 70 parts by weight to 60 parts by weight. Using this magnetic paint, an audio tape is produced.

EXAMPLE 3

A magnetic paint is prepared similarly to Example 1, with the added amount of titanium oxide used as an abrasive material in Example 1 decreased from 70 parts by weight to 50 parts by weight. Using this magnetic paint, an audio tape is produced.

EXAMPLE 4

A magnetic paint is prepared similarly to Example 1, with the added amount of titanium oxide used as an abrasive material in Example 1 decreased from 70 parts by weight to 40 parts by weight. Using this magnetic paint, an audio tape is produced.

EXAMPLE 5

A magnetic paint is prepared similarly to Example 1, using iron carbide having a saturation magnetization σs of 96 emu/g, long axis length of 0.20 μm and a coercive force Hc of 54000 A/m. An audio tape is produced by using this magnetic paint.

EXAMPLE 6

A magnetic paint is prepared similarly to Example 1, using as magnetic powder a mixture of 50 parts by weight of Co-γ-$Fe_2O_3$ having a saturation magnetization σs of 83 emu/g, long axis length of 0.20 μm and a coercive force Hc of 54000 A/m and 50 parts by weight of iron carbide having a saturation magnetization σs of 95 emu/g, long axis length of 0.20 μm and a coercive force Hc of 54000 A/m. Using this magnetic paint, an audio tape is produced.

EXAMPLE 7

A magnetic paint is prepared similarly to Example 1, using as magnetic powder a mixture of 80 parts by weight of Co-γ-$Fe_2O_3$ having a saturation magnetization σs of 83 emu/g, long axis length of 0.20 μm and a coercive force Hc of 54000 A/m and 20 parts by weight of ferromagnetic metallic powder having a saturation magnetization σs of 135 emu/g and a coercive force Hc of 56000 A/m. Using this magnetic paint, an audio tape is produced.

EXAMPLE 8

A magnetic paint is prepared similarly to Example 1, using as magnetic powder a mixture of 80 parts by weight of iron carbide having a saturation magnetization σs of 95 emu/g, long axis length of 0.20 μm and 20 parts by weight of ferromagnetic metallic powder having a saturation magnetization σs of 135 emu/g and a coercive force Hc of 56000 A/m. Using this magnetic paint, an audio tape is produced.

EXAMPLE 9

A magnetic paint is prepared similarly to Example 1, with the titanium oxide used as an abrasive material in Example 1 replaced with α-$Fe_2O_3$ having a particle diameter of 0.28 μm and Moh's hardness of 6. Using this magnetic paint, an audio tape is produced.

EXAMPLE 10

A magnetic paint is prepared similarly to Example 1, with the titanium oxide used as an abrasive material in Example 1 replaced with α-$Al_2O_3$ having a particle diameter of 0.15 μm and Moh's hardness of 9. Using this magnetic paint, an audio tape is produced.

EXAMPLE 11

A magnetic paint is prepared similarly to Example 1, with the titanium oxide used as an abrasive material in Example 1 replaced with SiC having a particle diameter of 0.15 μm and Moh's hardness of 9.5. Using this magnetic paint, an audio tape is produced.

EXAMPLE 12

A magnetic paint is prepared similarly to Example 1, with the added amount of titanium oxide used as an abrasive material in Example 1 increased from 70 parts by weight to 92 parts by weight. Using this magnetic paint, an audio tape is produced.

COMPARATIVE EXAMPLE 1

A magnetic paint is prepared similarly to Example 1, with the added amount of titanium oxide used as an abrasive material in Example 1 reduced from 70 parts by weight to 25 parts by weight. Using this magnetic paint, an audio tape is produced.

COMPARATIVE EXAMPLE 2

A magnetic paint is prepared similarly to Example 7, with the added amount of titanium oxide used as an abrasive material in Example 7 reduced from 70 parts by weight to 25 parts by weight. Using this magnetic paint, an audio tape is produced.

COMPARATIVE EXAMPLE 3

A magnetic paint is prepared similarly to Example 1, with the titanium oxide having a particle diameter of 0.25 μm used as an abrasive material in Example 1 replaced with titanium oxide having a particle diameter of 0.5 μm. Using this magnetic paint, an audio tape is produced.

COMPARATIVE EXAMPLE 4

A magnetic paint is prepared similarly to Example 1, with α-$Al_2O_3$ having a particle diameter of 0.15 μm used as an abrasive material in Example 10 replaced with α-$Al_2O_3$ having a particle diameter of 0.3 μm. Using this magnetic paint, an audio tape is produced.

COMPARATIVE EXAMPLE 5

The added amount of the Co-γ-$Fe_2O_3$ used as magnetic powder in Example 7 is reduced from 80 parts by weight to 50 parts by weight, and the added amount of the ferromagnetic metallic powder is increased from 20 parts by weight to 50 parts by weight. A magnetic paint is prepared similarly to Example 7, and an audio tape is produced using this magnetic paint.

COMPARATIVE EXAMPLE 6

The number of the total parts by weight containing the vinyl chloride resin, polyurethane resin, hardener (coronate L) all used in Example 1 is reduced from 37.5 parts by weight (22 parts by weight with respect to 100 parts by weight of the total of the magnetic powder and abrasive material) to 20 parts by weight (12 parts by weight with respect to 100 parts by weight of the total of the magnetic powder and abrasive material), so that a magnetic paint is prepared in the same way as in Example 1. By using the magnetic paint, an audio tape is produced.

COMPARATIVE EXAMPLE 7

The number of the total parts by weight containing the vinyl chloride resin, polyurethane resin, hardener (coronate L) all used in Example 1 is increased from 37.5 parts by weight (22 parts by weight with respect to 100 parts by weight of the total of the magnetic powder and abrasive material) to 55 parts by weight (33 parts by weight with respect to 100 parts by weight of the total of the magnetic powder and abrasive material), so that a magnetic paint is prepared in the same way as in Example 1. By using the magnetic paint, an audio tape is produced.

Tables 1-1 and 1-2 show measurements of an error rate (SER), sound-skip test, electromagnetic conversion characteristic, the amount of pulverized magnetic layer adhering to the head, the degree of head wear, friction factor, and scratch characteristic, of the audio tape each obtained in the examples (Table 1-1) and comparative examples (Table 1-2). Each measurement item is measured under the following conditions.

TABLE 1-1

| | Error Rate (E-4) | | | Sound-Skip Test | | Head Wear (500 hours) | | Head Pulverization | |
|---|---|---|---|---|---|---|---|---|---|
| | | | | After Endurance (50 Reciprocations for Each Enviroment) | | | | | |
| | Initial | 3° C. 80% | 40° C. 80% | 3° C. 80% | 40° C. 80% | 3° C. 80% | 40° C. 80% | 3° C. 80% | 40° C. 80% |
| Ex. 1 | 0.23 | 0.33 | 0.30 | ◯ | ◯ | ◯ | ◯ | ◯ | ◯ |
| Ex. 2 | 0.33 | 0.88 | 0.73 | ◯ | ◯ | ◯ | ◯ | Δ | ◯ |
| Ex. 3 | 0.19 | 0.92 | 0.77 | Δ | ◯ | ◯ | ◯ | Δ | Δ |
| Ex. 4 | 0.45 | 1.09 | 1.21 | Δ | Δ | ◯ | ◯ | Δ | Δ |
| Ex. 5 | 0.14 | 0.27 | 0.53 | Δ | ◯ | ◯ | ◯ | ◯ | ◯ |
| Ex. 6 | 0.28 | 0.41 | 0.39 | ◯ | ◯ | ◯ | ◯ | ◯ | ◯ |
| Ex. 7 | 0.18 | 0.33 | 0.28 | ◯ | ◯ | ◯ | ◯ | ◯ | ◯ |
| Ex. 8 | 0.23 | 0.33 | 0.30 | ◯ | ◯ | ◯ | ◯ | ◯ | ◯ |
| Ex. 9 | 0.14 | 0.27 | 0.53 | Δ | ◯ | ◯ | ◯ | ◯ | ◯ |
| Ex. 10 | 0.28 | 0.41 | 0.39 | Δ | ◯ | ◯ | ◯ | ◯ | ◯ |
| Ex. 11 | 0.18 | 0.33 | 0.28 | ◯ | ◯ | ◯ | ◯ | ◯ | ◯ |
| Ex. 12 | 0.18 | 0.23 | 0.28 | ◯ | ◯ | ◯ | ◯ | ◯ | ◯ |

| | Electromagnetic Cnversion Characteristic Output (dB) | | Friction Factor | | Scratch Characteristics |
|---|---|---|---|---|---|
| | 9.6 kHz | 48 kHz | $\mu$kl | $\mu$k 500 | (Number of Pass) |
| Ex. 1 | 0 | 0 | 0.231 | 0.198 | 88 |
| Ex. 2 | 0.3 | 0.2 | 0.225 | 0.215 | 81 |
| Ex. 3 | 0.7 | 0.5 | 0.219 | 0.203 | 74 |
| Ex. 4 | 1.0 | 0.6 | 0.233 | 0.231 | 65 |
| Ex. 5 | 0.3 | 0.1 | 0.221 | 0.201 | 85 |
| Ex. 6 | 0.2 | −0.2 | 0.229 | 0.207 | 107 |
| Ex. 7 | 0.1 | 0.3 | 0.230 | 0.201 | 121 |
| Ex. 8 | 0 | 0 | 0.231 | 0.198 | 118 |
| Ex. 9 | 0.3 | 0.1 | 0.221 | 0.201 | 85 |
| Ex. 10 | 0.2 | −0.2 | 0.229 | 0.207 | 87 |
| Ex. 11 | 0.1 | 0.3 | 0.230 | 0.201 | 81 |
| Ex. 12 | −1.0 | −1.0 | 0.230 | 0.205 | 90 |

TABLE 1-2

| | Error Rate (E-4) | | | Sound-Skip Test | | Head Wear (500 hours) | | Head Pulverization | |
|---|---|---|---|---|---|---|---|---|---|
| | | | | After Endurance (50 Reciprocations for Each Enviroment) | | | | | |
| | Initial | 3° C. 80% | 40° C. 80% | 3° C. 80% | 40° C. 80% | 3° C. 80% | 40° C. 80% | 3° C. 80% | 40° C. 80% |
| Comp. Ex. 1 | 0.55 | 6.90 | 4.99 | X | Δ | ◯ | ◯ | X | X |
| Comp. Ex. 2 | 0.68 | 3.86 | 4.12 | X | Δ | ◯ | ◯ | X | X |
| Comp. Ex. 3 | 0.59 | 3.87 | 0.61 | Δ | ◯ | X | X | Δ | ◯ |
| Comp. Ex. 4 | 0.66 | 1.23 | 0.65 | Δ | ◯ | X | Δ | ◯ | ◯ |
| Comp. Ex. 5 | 3.32 | 7.39 | 6.41 | Δ | Δ | ◯ | ◯ | X | Δ |
| Comp. Ex. 6 | 0.21 | 7.90 | 8.12 | X | X | ◯ | ◯ | X | X |
| Comp. Ex. 7 | 1.03 | 6.98 | 3.98 | X | Δ | ◯ | ◯ | Δ | Δ |

TABLE 1-2-continued

|  | Electromagnetic Cnversion Characteristic Output (dB) | | Friction Factor | | Scratch Characteristics |
| --- | --- | --- | --- | --- | --- |
|  | 9.6 kHz | 48 kHz | $\mu$k1 | $\mu$k 500 | (Number of Pass) |
| Comp. Ex. 1 | 1.3 | −0.1 | 0.231 | 0.200 | 48 |
| Comp. Ex. 2 | 2.5 | −0.1 | 0.227 | 0.202 | 55 |
| Comp. Ex. 3 | 0.2 | −1.5 | 0.219 | 0.197 | 99 |
| Comp. Ex. 4 | 0.1 | −1.4 | 0.233 | 0.222 | 107 |
| Comp. Ex. 5 | 2.1 | −3.3 | 0.239 | 0.199 | 86 |
| Comp. Ex. 6 | 0.2 | 0.1 | 0.218 | 0.200 | 32 |
| Comp. Ex. 7 | 0.2 | −1.7 | 0.320 | 0.420 | 109 |

Error Rate

By using a commercially available DCC recorder (RS-DC10: manufactured by Matsushita Electric Industrial Co., Ltd.) and an error rate measuring apparatus (DEMS2000: manufactured by Philips Japan Ltd.), an initial error rate and an error rate after the endurance traveling of an audio tape are measured. The environments for the endurance traveling are as follows:

Endurance environment: 3° C. 80% RH
  40° C. 80% RH
Traveling mode: PLAY-REVERSE
The number of Traveling Pass: 50 reciprocations
  (A and B sides)

Sound-Skip Test

Signals of 1 kHz and 0 dB are recorded entirely on both A side and B side of a tape of the commercially available DCC deck (RS-DC10: manufactured by Matsushita Electric Industrial Co., Ltd.), and an output level during the endurance traveling for 50 reciprocations under the above environments is detected and monitored by using a recorder, thereby evaluating the sound skip.

○: No sound skip occurs during the traveling for 50 reciprocations.
Δ: Momentary sound skip (1 sec or less) occurs.
×: Continuous sound skip (1 sec or more) occurs.

Electromagnetic Conversion Characteristic

By using the commercially available DCC deck (RS-DC10: manufactured by Matsushita Electric Industrial Co., Ltd.), outputs of 9.6 kHz and 48 kHz are measured. In addition, all measurement values are shown by representing the value of Example 1 as 0 dB.

Head Pulverization

By using the commercially available DCC deck (RS-DC10: manufactured by Matsushita Electric Industrial Co., Ltd.), the state of pulverized magnetic layer adhering onto a head face is estimated by visual observation in the case of endurance traveling under the above environments.

○: No pulverization onto the head face is recognized.
Δ: Pulverization onto the head face occurs slightly, resulting in a little deterioration of the error rate.
×: Pulverization onto the head face occurs heavily, resulting in a significant deterioration of the error rate.

Head Wear

By using the commercially available DCC deck (RS-DC10: manufactured by Matsushita Electric Industrial Co., Ltd.), a wear state of the head face is estimated by visual observation, in the case of endurance traveling for 500 hours under the above environments.

○: No head wear is recognized.
Δ: Head wear occurs slightly and the head face partially peels off.
×: Head wear occurs significantly and the head face entirely peels off.

Friction Factor

In the case where an audio tape is traveled at 4 cm/sec under the condition that it winds a stainless pin of 4$\phi$ at an angle of 180°, the values of an incoming tension Ti and an outgoing tension To are obtained with the following formula.

$$\mu k = 1n(To/Ti)/\pi$$

wherein $\mu$k1 and $\mu$k500 represent the friction coefficient for the 1st pass and for the 500th pass, respectively.

Scratch Characteristic

In the case where a steel ball of 3 $\phi$ is slid on a tape with a load of 40 g and at 4 cm/sec, the number of pass is estimated by visual observation by the time the magnetic layer is entirely peeled off from a base film.

As is apparent from Table 1-1, according to the present invention, by appropriately controlling the particle diameter and Moh's hardness of the abrasive material as shown in Examples 1 to 12, a tape whose magnetic layer is not easily peeled off from the magnetic support can be obtained without causing any head wear. As a result, substantially no pulverization occurs after the endurance traveling and the error rate is not significantly deteriorated. Moreover, nearly no sound skip occurs for the test using a practical apparatus. As the added amount of the abrasive material decreased from 70 parts (Example 1) to 40 parts (Example 4), the hardness of the paint film lowers; and the error rate, the pulverization characteristic, and the sound skip characteristic after the endurance traveling slightly deteriorate. However, such a level of deterioration is negligible for practical use. In Comparative Examples 1 and 2 where the abrasive material is added in the amount of 25 parts, the scratch characteristic is not satisfactory, as will be described later. Accordingly, the abrasive material is preferably added in the amount of at least 30 parts, and more preferably in the amount of at least 40 parts. Moreover, since $\sigma$s and the like of the magnetic powder are appropriately controlled, necessary electromagnetic conversion characteristics are ensured, even though a great excess of the abrasive material is added.

Furthermore, as is shown in Example 12, when the added amount of the abrasive material exceeds 90 parts by weight, the electromagnetic conversion characteristic is deteriorated, compared with the values in Examples 1 to 11. However, the result shows that characteristics other than the electromagnetic characteristic are excellent. Especially, no pulverization occurs after endurance traveling and the error rate is not deteriorated. The tape could be efficiently put to practical use as a DCC tape, with such a degree of deterioration of the electromagnetic characteristic. Accordingly, even though the added amount of abrasive material is 90 parts by weight or more, the effect of the invention can be obtained, unless the added amount is not so large.

On the other hand, in the case where the added amount of the abrasive material is small as shown in Comparative Examples 1 and 2, the electromagnetic characteristic and the initial error rate are excellent. However, the hardness of a paint film is not sufficient such that the scratch characteristic is not satisfactory and the like. Moreover, pulverization significantly occurs after the endurance traveling, resulting in deterioration of the error rate. Furthermore, in the case of using an abrasive material whose average particle diameter is large as shown in Comparative Examples 3 and 4, head wear occurs and the electromagnetic characteristic is deteriorated, resulting in deterioration of the initial error rate and sometimes also in the error rate after the endurance traveling. Further, in the case where a metal magnetic powder is mixed into the magnetic powder by a larger ratio as shown in Comparative Example 5, deterioration on the surface and the like are caused, resulting in a significant deterioration of the electromagnetic conversion characteristic and of the error rate from the initial point thereof. In the case where the amount of a binder resin to be used as in Comparative Example 6 is small, the absorption to the magnetic powder becomes insufficient, resulting in a weak hardness of the paint film. Moreover, pulverization significantly occurs after endurance traveling, which deteriorates the error rate. In contrast, in the case where the amount of the binder resin is extremely large as shown in Comparative Example 7, the surplus resin in the magnetic layer rises on the magnetic layer especially in a calender process, resulting in an increase of the friction factor with the head. As a result, the error rate after endurance traveling becomes deteriorated.

As is mentioned above, by using an abrasive material in an excessive added amount much larger than the conventional added amount, and a ferromagnetic powder whose long axis is small and saturation magnetization σs is large, a magnetic recording medium is obtained, suitable for a DCC tape which requires more strict characteristics than a dusting characteristic and magnetic characteristic necessary for conventional DAT tapes and ACC tapes. In the above mentioned examples, the magnetic recording medium is described as the one used for the DCC tape. However, the magnetic recording medium of the present invention can be used for a magnetic recording medium having a small dusting characteristic and a high magnetic energy, and requiring a high output, as well as for the DCC tape. More specifically, the present invention can be applied to a magnetic recording medium for use in a record/playback apparatus in which information is recorded with a high density in the magnetic recording medium by using a fixed head. Moreover, the magnetic recording medium of the present invention can be used as a tape of a high quality for conventional ACC tapes, VHS-type VCR tapes, and the like.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic recording medium comprising a non-magnetic polymeric support and a magnetic layer on the non-magnetic polymeric support; the magnetic layer positioned on an outer surface of the magnetic recording medium and including ferromagnetic powder, abrasive material effective for restraining pulverization and improving wear durability of the magnetic layer and binder resin, with at least 40 parts by weight of the abrasive material per 100 parts by weight of the ferromagnetic powder, wherein the ferromagnetic powder has a saturation magnetization σs of 80 emu/g or more and long axis length of 0.25 μm or less, the abrasive material having a Mohs hardness of at least about 5, and the binder resin is present in the range of about 15 to about 30 parts by weight per 100 parts of the total amount of the ferromagnetic powder and the abrasive material.

2. A magnetic recording medium according to claim 1, wherein the ferromagnetic powder includes at least one of magnetic gamma iron oxide powder, magnetic iron carbide powder and ferromagnetic metallic powder.

3. A magnetic recording medium according to claim 2, wherein the ferromagnetic powder includes magnetic gamma iron oxide, and the magnetic layer contains 40 to 90 parts by weight of the abrasive material per 100 parts by weight of the ferromagnetic powder.

4. A magnetic recording medium according to claim 2, wherein the ferromagnetic powder includes magnetic iron carbide, and the magnetic layer contains 40 to 90 parts by weight of the abrasive material per 100 parts by weight of the ferromagnetic powder.

5. A magnetic recording medium according to claim 2, wherein the ferromagnetic powder includes ferromagnetic metallic powder having the saturation magnetization σs of 130 emu/g or more, and the magnetic layer contains 40 to 130 parts by weight of the abrasive material per 100 parts by weight of the ferromagnetic powder.

6. A magnetic recording medium according to claim 5, wherein the ferromagnetic powder includes 30% by weight or less of ferromagnetic metallic powder.

7. A magnetic recording medium according to claim 2, wherein the ferromagnetic powder has a coercive force in the range of 50000 to 60000 A/m.

8. A magnetic recording medium according to claim 1, wherein the abrasive material includes at least one of an abrasive material of particle diameter of 0.4 μm or less with a Moh's hardness of 5.to 7 and an abrasive material of particle diameter of 0.25 μm or less with a Moh's hardness of 7 or more.

9. A magnetic recording medium according to claim 2, wherein the abrasive material includes at least one of an abrasive material of particle diameter of 0.4 μm or less with a Moh's hardness of 5 to 7 and an abrasive material of particle diameter of 0.25 μm or less with a Moh's hardness of 7 or more.

10. A magnetic recording medium according to claim 2, wherein 15 to 30 parts by weight of the binder resin is contained per 100 parts by weight of the total of the ferromagnetic powder and the abrasive material.

11. A magnetic recording medium for a digital compact cassette tape, comprising a non-magnetic polymeric support and a magnetic layer on the non-magnetic polymeric support, the magnetic layer positioned on an outer surface of the magnetic recording medium and including ferromagnetic powder, binder resin and abrasive material effective for restraining pulverization and improving wear durability of the magnetic layer with the ratio of at least 40 parts by weight of the abrasive material per 100 parts by weight of the ferromagnetic powder, wherein the ferromagnetic powder has a saturation magnetization σs of 80 emu/g or more and long axis length of 0.3 μm or less, the abrasive material having a Mohs hardness of at least about 5, and the binder resin is present in the range of about 15 to about 30 parts by weight per 100 parts of the total amount of the ferromagnetic powder and the abrasive material.

12. A magnetic recording medium for a digital compact cassette tape according to claim 11, wherein the abrasive material includes at least one of an abrasive material of particle diameter of 0.4 μm or less with a Moh's hardness of 5 to 7 and an abrasive material of particle diameter of 0.25 μm or less with a Moh's hardness of 7 or more.

13. A magnetic recording medium comprising:
a non-magnetic polymeric support; and
a magnetic layer on the non-magnetic polymeric support, the magnetic layer positioned on an outer surface of the magnetic recording medium and including ferromagnetic powder, abrasive material effective for restraining pulverization and improving wear durability of the magnetic layer and binder resin, with at least 40 parts by weight of the abrasive material per 100 parts by weight of the ferromagnetic powder,
wherein the ferromagnetic powder includes at least one of magnetic gamma iron oxide powder, magnetic iron carbide powder and ferromagnetic metallic powder, the abrasive material having a Mohs hardness of at least about 5, and the binder resin is present in the range of about 15 to about 30 parts by weight per 100 parts of the total amount of the ferromagnetic powder and the abrasive material.

14. A magnetic recording medium according to claim 13, wherein the ferromagnetic powder includes magnetic gamma iron oxide having a saturation magnetization σs of 80 emu/g or more and long axis length of 0.25 μm or less, and the magnetic layer contains 40 to 90 parts by weight of the abrasive material per 100 parts by weight of the ferromagnetic powder.

15. A magnetic recording medium according to claim 13, wherein the ferromagnetic powder includes magnetic iron carbide having a saturation magnetization σs of 80 emu/g or more and long axis length of 0.25 μm or less, and the magnetic layer contains 40 to 90 parts by weight of the abrasive material per 100 parts by weight of the ferromagnetic powder.

16. A magnetic recording medium according to claim 13, wherein the ferromagnetic powder includes ferromagnetic metallic powder having a saturation magnetization σs of 130 emu/g or more, and the magnetic layer contains 40 to 130 parts by weight of the abrasive material per 100 parts by weight of the ferromagnetic powder.

17. A magnetic recording medium according to claim 16, wherein the ferromagnetic powder includes 30% by weight or less of ferromagnetic metallic powder.

18. A magnetic recording medium according to claim 13, wherein the ferromagnetic powder has a coercive force in the range of 50000 to 60000 A/m.

19. A magnetic recording medium according to claim 13, wherein the abrasive material includes at least one of an abrasive material of particle diameter of 0.4 μm or less with a Moh's hardness of 5 to 7 and an abrasive material of particle diameter of 0.25 μm or less with a Moh's hardness of 7 or more.

20. A magnetic recording medium according to claim 14, wherein the abrasive material includes at least one of an abrasive material of particle diameter of 0.4 μm or less with a Moh's hardness of 5 to 7 and an abrasive material of particle diameter of 0.25 μm or less with a Moh's hardness of 7 or more.

21. A magnetic recording medium according to claim 14, wherein 15 to 30 parts by weight of the binder resin is contained per 100 parts by weight of the total of the ferromagnetic powder and the abrasive material.

22. A magnetic recording medium for a digital compact cassette tape, comprising:
a non-magnetic polymeric support; and
a magnetic layer on the non-magnetic polymeric support, the magnetic layer positioned on an outer surface of the magnetic recording medium and including ferromagnetic powder, abrasive material effective for restraining pulverization and improving wear durability of the magnetic layer and binder resin, with at least 40 parts by weight of the abrasive material per 100 parts by weight of the ferromagnetic powder,
wherein the ferromagnetic powder includes at least one of magnetic gamma iron oxide powder, magnetic iron carbide powder and ferromagnetic metallic powder, the ferromagnetic powder has a saturation magnetization σs of 80 emu/g or more and long axis length of 0.25 μm or less, the abrasive material having a Mohs hardness of at least about 5, and the binder resin is present in the range of about 15 to about 30 parts by weight per 100 parts of the total amount of the ferromagnetic powder and the abrasive material.

23. A magnetic recording medium for a digital compact cassette tape according to claim 22, wherein the magnetic layer contains 40 to 90 parts by weight of the abrasive material per 100 parts by weight of the ferromagnetic powder.

24. A magnetic recording medium for a digital compact cassette tape according to claim 22, wherein the ferromagnetic powder includes ferromagnetic metallic powder having a saturation magnetization σs of 130 emu/g or more, and the magnetic layer contains 40 to 130 parts by weight of the abrasive material per 100 parts by weight of the ferromagnetic powder.

25. A magnetic recording medium for a digital compact cassette tape according to claim 24, wherein the ferromagnetic powder includes 30% by weight or less of ferromagnetic metallic powder.

26. A magnetic recording medium for a digital compact cassette tape according to claim 22, wherein the ferromagnetic powder has a coercive force in the range of 50000 to 60000 A/m.

27. A magnetic recording medium for digital compact cassette tape according to claim 26, wherein the magnetic layer contains 40 to 90 parts by weight of the abrasive material per 100 parts by weight of the ferromagnetic powder.

28. A magnetic recording medium for a digital compact cassette tape according to claim 23, wherein the abrasive material includes at least one of an abrasive material of particle diameter of 0.4 μm or less with a Moh's hardness of 5 to 7 and an abrasive material of particle diameter of 0.25 μm or less with a Moh's hardness of 7 or more.

29. A magnetic recording medium for a digital compact cassette tape according to claim 24, wherein the abrasive material includes at least one of an abrasive material of particle diameter of 0.4 μm or less with a Moh's hardness of 5 to 7 and an abrasive material of particle diameter of 0.25 μm or less with a Moh's hardness of 7 or more.

30. A magnetic recording medium according to claim 24, wherein 15 to 30 parts by weight of the binder resin is contained per 100 parts by weight of the total of the ferromagnetic powder and the abrasive material.

* * * * *